United States Patent [19]

Fuwa et al.

[11] 4,250,526
[45] Feb. 10, 1981

[54] OPTICAL INFORMATION READING DEVICE

[75] Inventors: Jyoichi Fuwa, Atsugi; Toshifumi Asakawa, Yamato, both of Japan

[73] Assignee: Ricoh Company, Ltd., Tokyo, Japan

[21] Appl. No.: 41,790

[22] Filed: May 23, 1979

[30] Foreign Application Priority Data

May 25, 1978 [JP] Japan ................................ 53-61688

[51] Int. Cl.³ ............................................. H04N 1/12
[52] U.S. Cl. .................................... 358/294; 235/455; 340/146.3 AG; 358/285; 358/293
[58] Field of Search ................ 235/455; 358/285, 293, 358/294, 280; 365/127, 183; 340/146.3 AG

[56] References Cited

U.S. PATENT DOCUMENTS

| | | | |
|---|---|---|---|
| 3,239,602 | 3/1966 | Lemelson | 179/100.1 G |
| 3,750,114 | 7/1973 | Valassis | 365/127 |
| 3,864,550 | 2/1975 | Cragon | 365/183 |
| 3,941,979 | 3/1976 | Cragon | 365/183 |
| 3,952,290 | 4/1976 | Williams | 365/183 |
| 4,173,772 | 11/1979 | White | 358/213 |

*Primary Examiner*—Howard W. Britton
*Attorney, Agent, or Firm*—Burgess, Ryan and Wayne

[57] ABSTRACT

A light source capable of producing intermittent flashes of light is used as a light source for illuminating an original. The light source is triggered in response to the read signal and a self-scanning type array of light receptors accumulates the charge representative of a light image focused thereon. In synchronism with the triggering of the light source, the video output is derived from memory means which stores the charge thus accumulated.

2 Claims, 6 Drawing Figures

OPTICAL INFORMATION READING DEVICE

BACKGROUND OF THE INVENTION

The present invention relates to generally an optical image reader and more particularly a light source for an optical information reading device with a self-scanning type array of light receptors.

In general tungsten halogen lamps and fluorescent lamps are used as a light source for the optical image readers.

The tungsten halogen lamp may produce highly brilliant light, but dissipates a considerable quantity of heat so that the power consumption is high and accordingly the conversion efficiency is unsatisfactorily low. The fluorescent lamp dissipates less heat so that its conversion efficiency is high, but its light output per unit of length is less as compared with the tungsten halogen lamp so that when it is used as a light source for an optical image reader, the exposure time inevitably becomes longer. In the case of an optical image reader of the type having a head consisting of a self-scanning type array of light receptors, the charge accumulation due to dark current in the light receptor increases, resulting in the degradation of the signal-to-noise ratio S/N and in an unsatisfactorily slow reading speed.

SUMMARY OF THE INVENTION

Accordingly the primary object of the present invention is to provide an optical inforamtion reading device with a light source which may dissipate less heat, consume less electric power and produce highly brilliant light.

To the above and other ends, briefly stated, the present invention provides an optical inforamtion reading device comprising a means for generating the trigger pulse in response to the read signal, a light source which is triggered by the trigger pulse so as to produce intermittent flashes of light for illuminating an original, an array of light receptors each of which may accumulate the charge in proportion to the intensity of light falling thereon, memory means for storing the accumulated charge information, a pulse generating means for generating pulses so as to cause the transfer of the charge in the light receptors to said memory means, and a means for deriving the video output from said memory means.

DESCRIPTION OF THE PREFERRED EMBODIMENT

Figure 1:
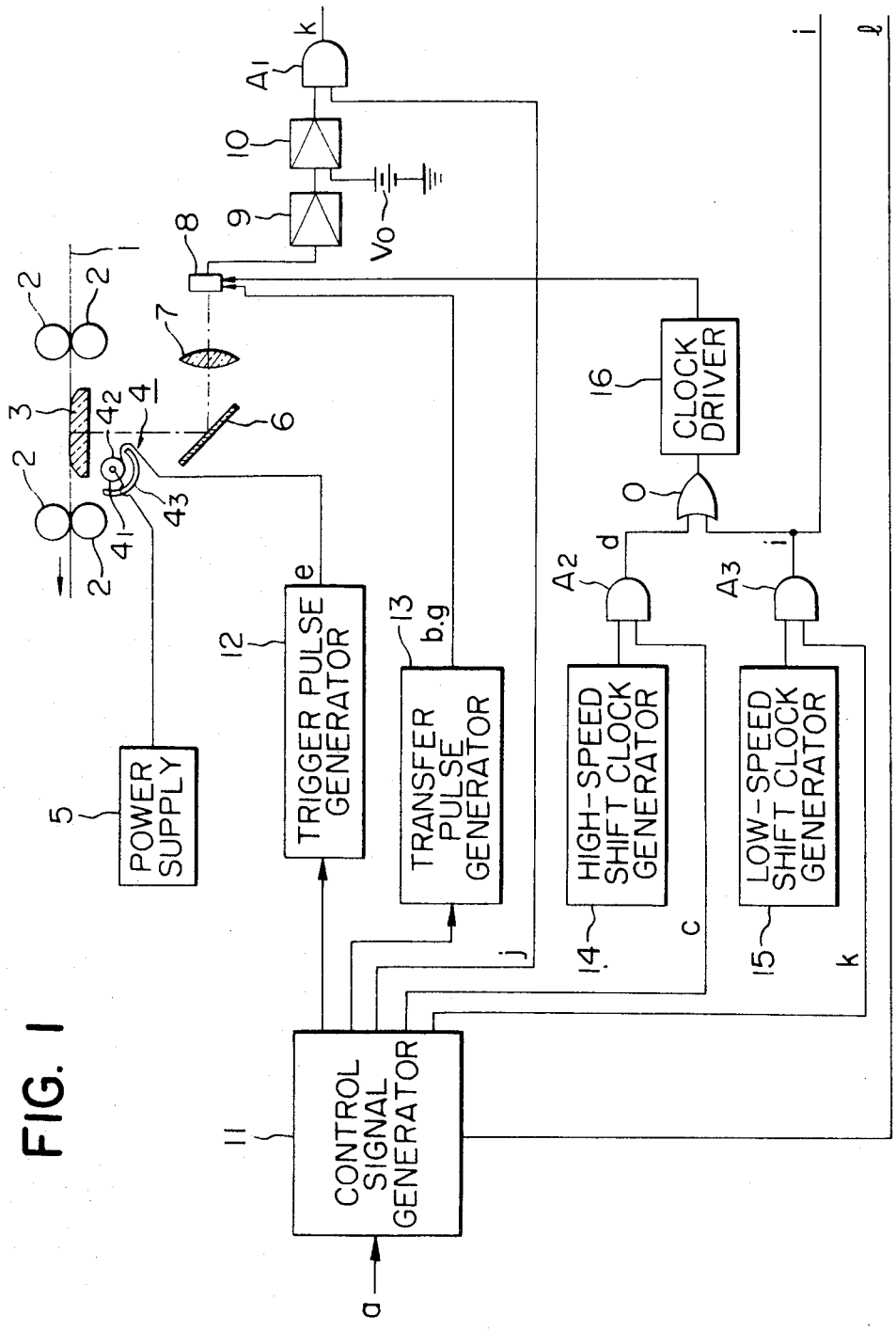
FIG. 1 is a block diagram of a preferred embodiment of an optical information reading device in accordance with the present invention.

An original 1 which is transported by pairs of feed rollers 2 in the direction indicated by an arrow is made into contact with a contact glass 3 so that the original 1 may be maintained flat. An illumination source generally indicated by the reference numeral 4 comprises a xenon flashtube 41, an external or trigger electrode 42 and a reflecting mirror 43. The flash lamp circuit is connected to a power supply 5. Flashes of light emitted from the flash lamp 41 illuminate the original 1 at a predetermined position, and the light is reflected back from the original 1 and is focused through a reflecting mirror 6 and a focusing lens 7 on a self-scanning type array of light receptors 8.

The output or video information from the light receptor array 8 is amplified by a video amplifier 9 and applied to a converter 10 so as to be converted into the binary signal, which in turn is applied to a video output gate A1 which comprises an AND gate.

A control signal generator 11 generates the control signals and the line sync signal l at a predetermined timing so as to control a trigger pulse generator 12, a transfer pulse generator 13, the video output gate A1, a high-speed clock gate A2 and a low-speed clock gate A3.

In response to the control signal from the control signal generator 11, the trigger pulse generator 12 generates the trigger pulse e at a predetermined timing so as to trigger the flash lamp 41. In response to the control signal from the control signal generator 11, the transfer pulse generator 13 generates at a predetermined timing a first transfer pulse b and a second transfer pulse g. The first transfer pulse b is applied to the light receptor array 8 so as to transfer the signal which is generated by the dark current to the shift register to be described hereinafter. The second transfer pulse g is also applied to the light receptor array 8 so as to transfer the signal representing the light image focused on the light receptor array 8 into the shift registers.

The high-speed shift clock is generated by a high-speed shift clock generator 14 and is applied through the high-speed clock gate A2, an OR gate O and a clock driver 16 for amplifying the clock to the shift registers so as to dispel or eliminate the signal which is generated by the dark current. The high-speed clock gate A2 is opened for a predetermined time in response to the control signal from the control signal generator 11.

In like manner, the slow-speed shift clock is generated by a slow-speed shift clock generator 15 and is applied through the slow-speed clock gate A3, the OR gate O and the clock driver 16 to the shift registers so as to cause the transmission of the desired video signal to the video amplifier 9.

Figure 2:
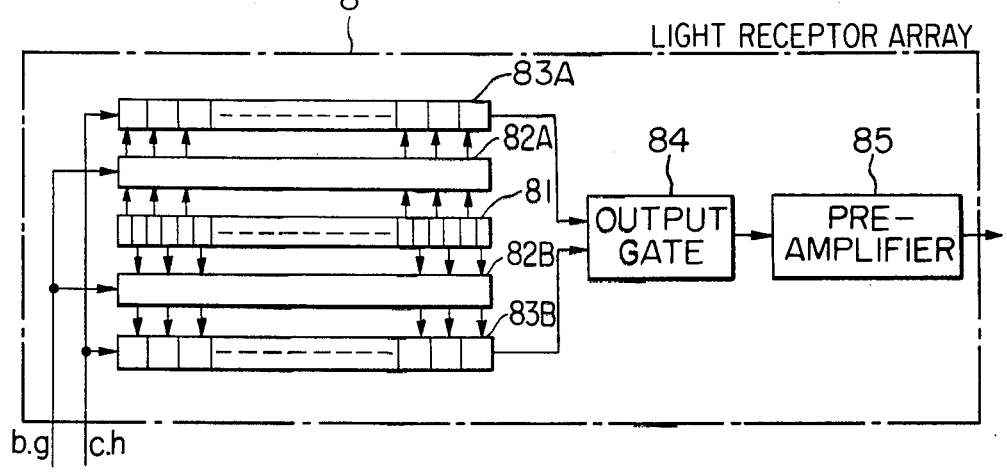
FIG. 2 is a block diagram of a self-scanning type array of light receptors.

In FIG. 2 is shown in block diagram the self-scanning type light receptor array 8. A light receptor array 81 comprises a plurality of light receptors which are divided into an odd number group consisting of the light receptors whose positions are odd-numbered and an even number group consisting of the light receptors whose positions are even-numbered. In response to the first or second transfer pulse b or g, the charges accumulated in the odd-number group are transferred in parallel through a transfer gate 82A to an analog shift register 83A. In like manner, the charges accumulated in the even-number group are transferred through a transfer gate 28B into an analog shift register 83B. In response to the high-speed or slow-speed transfer pulse c or h, the contents in the analog shift registers 83A and 83B are delivered through the output gate 84 and a pre-amplifier 85 to the video amplifier 9.

Figure 3:
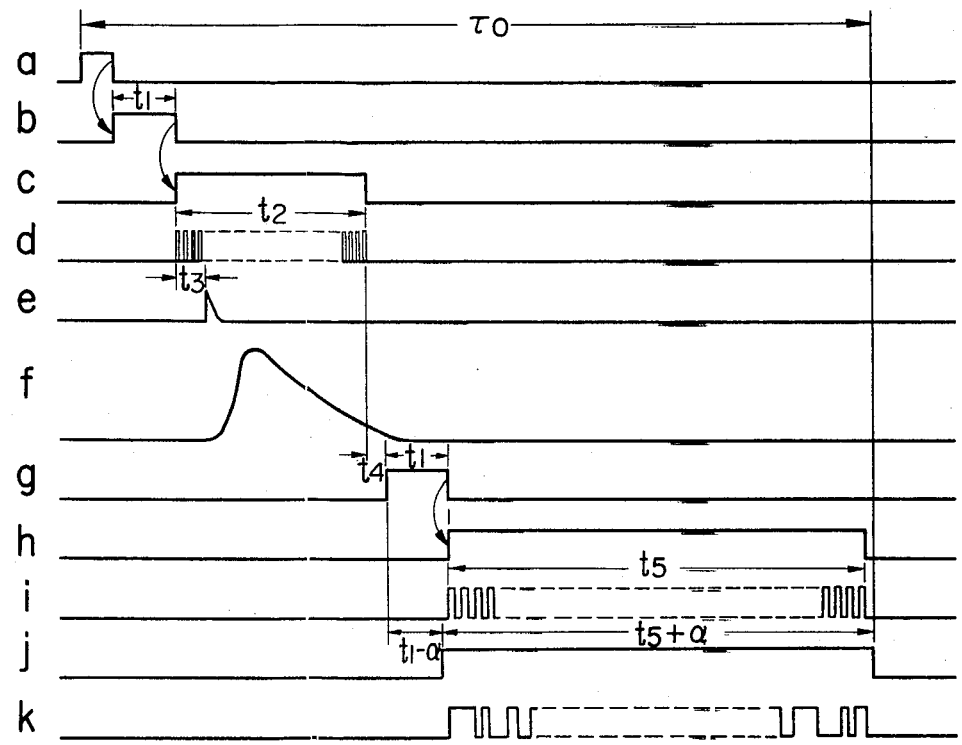
FIG. 3 shows the waveforms of the signals generated in the device shown in FIG. 1.

Referring further to FIG. 3, the mode of operation indicated by the arrow by the pairs of feed rollers 2, a read pulse a is generated by a system controller (not shown) and applied to the control signal generator 11. The control signal generator 11 then generates the control signal which is applied to the transfer pulse generator 13. The transfer pulse generator 13 then generates the first transfer pulse b which is applied to both the first and second transfer gates 82A and 82B so that the charges which are accumulated in the light receptors due to the dark current may be transferred into the charge-transfer type analog shift registers 83A and 83B.

When the charges due to the dark current are being transferred in the manner described above, the trigger generator 12 generates the trigger pulse e in response to the control signal from the control signal generator 11. The trigger signal e is applied to the trigger or external electrode 42 of the flash lamp 41 so taht the original 1 is illuminated by a brilliant flash of light produced by the flash lamp 41 for a short duration as indicated at f in FIG. 3. Therefore the image on the original 1 at the predetermined reading position is focused on the light receptor array 8 through the image focusing system consisting of the reflecting mirror 6 and the focusing lens 7. Therefore each light receptor is charged in proportion to the quantity of light reflected back from the corresponding picture element and impinged on the receptor.

After the signal due to the dark current in the shift registers 83A and 83B are transferred in response to the high-speed transfer pulse, the transfer pulse generator 13 generates the second transfer pulse g in response to the control signal from the control signal generator 11. The second transfer pulse g is applied to the first and second transfer gates 82A and 82B so that the charges accumulated in the light receptors when the original image is focused on them are transferred into the first and second shift registers 83A and 83B. Thereafter in response to the signal h from the control signal generator 11, the low-speed clock gate A3 is opened so that the slow-speed clock i from the slow-speed clock generator 15 is transmitted through the slow-speed clock gate A3 and the OR gate O to the clock driver 16 which in turn applies the slow-speed clock i to the shift registers 83A and 83B as the shift clock alternately as with the case of the high-speed clock. As a result the video information stored in the shift registers 83A and 83B are delivered through the output gate 84 and the preamplifier 85 to the video amplifier 9.

The output from the video amplifier 9 is applied to the binary converter 10 which compares its input with a reference or threshold voltage Vo and converts it into a binary signal. The output from the converter 10 is delivered as the video output k to the next stage through the output gate A1 which is opened for a predetermined time in response to the control signal from the control signal generator 11.

Prior to the delivery of the video output k, the optical information reading device generates the line sync signal l and the slow-speed clock i which is synchronized with the video output k. In response to the line sync signal l the next stage processes the video signal output k while in response to the slow-speed clock i the video output k is sampled.

So far the optical information reading device in accordance with the present invention has been described as incorporating the high-speed and slow-speed clock generators 14 and 15, but it is to be understood that the slow clock generator 15 may be eliminated if the next stage can process the signal in response to the fast clock. That is, the transfer pulse may be generated repetitively at a predetermined time interval and then the shift clock generated in response to the fast clock may follow the transfer pulse. Therefore in response to the read signal a which is applied immediately after the transfer pulse is generated, the flash lamp may be triggered immediately, and in response to the fast shift clock succeeding the transfer pulse the output k may be delivered to the next stage. With this arrangement the optical information reading device may be further simplified in construction and furthermore the read time may be considerably shortened.

So far the flash lamp has been described as consisting of an xenon flash lamp, but it is to be understood that any suitable lamp which may be triggered in response to the trigger pulse may be used.

Figure 4:
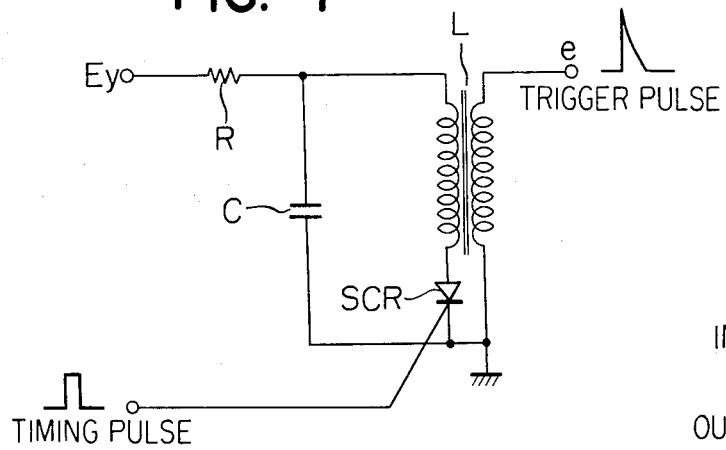
FIG. 4 shows a circuit of a trigger pulse generator 12 in detail.
Figure 6:
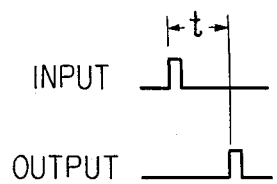
FIG. 6 shows the relation of time t between the input and the output in the monostable multivibrators.
Figure 5:
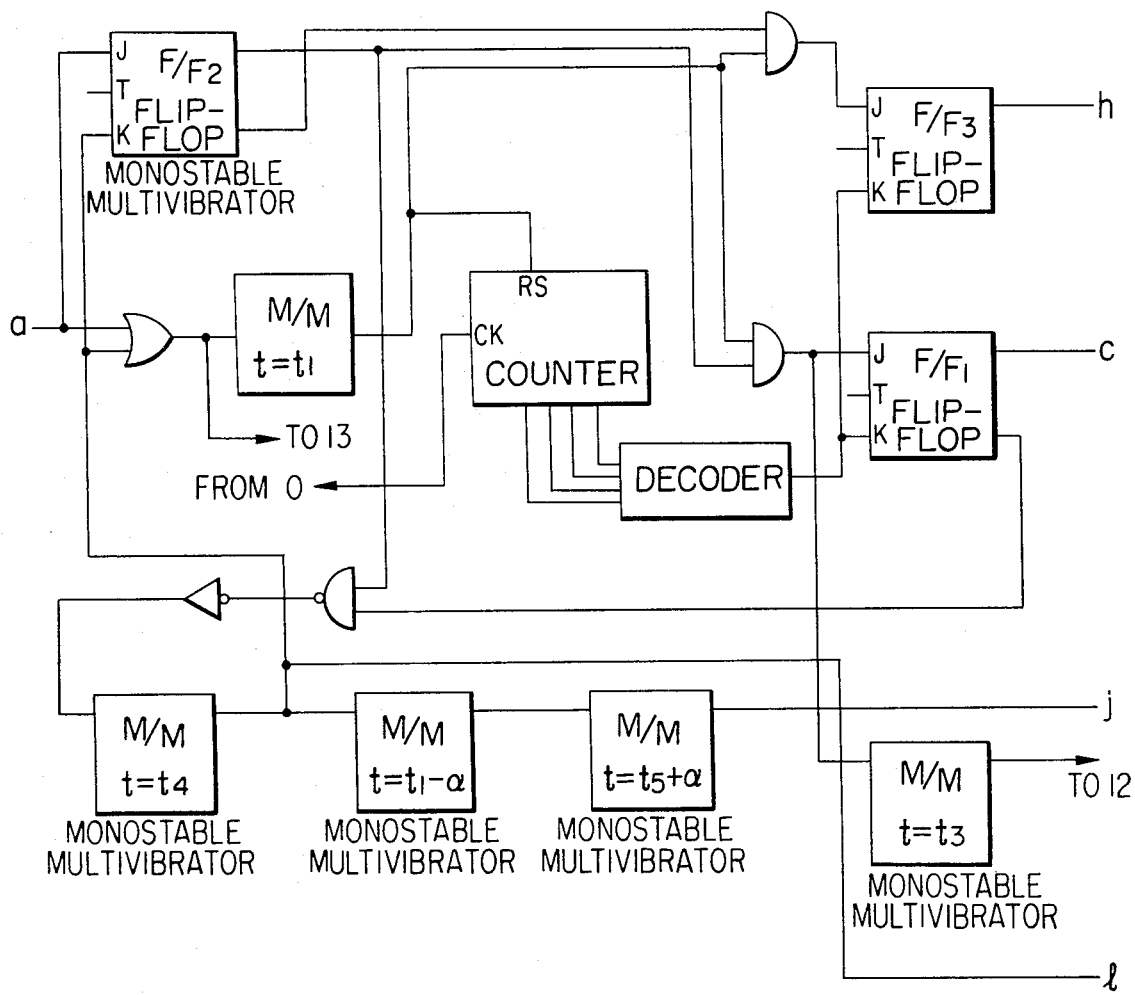
FIG. 5 shows a control signal generator.

FIG. 4 shows the circuit of the trigger pulse generator 12 in detail, and FIG. 5 shows the control signal generator comprising monostable multivibrators and flip-flops and so on. The relation of time t between the input and the output in these monostable multivibrators is shown in FIG. 6.

In summary, in the optical information reading device with the self-scanning type light receptor array, a light source which can intermittently flash is used as a light source for illuminating the original and is triggered in response to the read signal. As a result the power consumption may be minimized. Furthermore the reading is accomplished immediately after the light source is triggered to flash for a short duration, the charge accumulation due to the dark current is almost negligible so that the video output may be derived with a high signal-to-noise ratio S/N.

What is claimed is:

1. An optical information reading device for reading an image from an original document in response to a read instruction, comprising:
   (a) means responsive to said read instruction for generating a trigger pulse;
   (b) a light source for producing flashes of light intermittently in response to said trigger pulse, to illuminate said original document;
   (c) an array of light receptors each of which may accumulate a charge representative of a corresponding picture element of the illuminated image on said original document;
   (d) memory means for storing each of said accumulated charges;
   (e) means coupled to said array for generating pulses to cause the transfer of the charge accumulated in each of the light receptors into said memory means in synchronism with the flashing of said light source; and
   (f) means for deriving from said memory means a video output signal representative of said illuminated image.

2. An optical information reading device as set forth in claim 1, wherein said array of light receptors comprises a line-type self-scanning array, of said receptors, and the charge accumulated in the light receptors whose positions are even numbered is stored in a first analog shift register while the charge accumulated in the light receptors whose positions are odd numbered is stored in a second analog shift register.

* * * * *

UNITED STATES PATENT AND TRADEMARK OFFICE
CERTIFICATE OF CORRECTION

PATENT NO. : 4,250,526
DATED : February 10, 1981
INVENTOR(S) : Jyoichi Fuwa et al.

It is certified that error appears in the above—identified patent and that said Letters Patent is hereby corrected as shown below:

In the Title page, after Inventors: "Atsugi" should be --Kanagawa-ken--; "Yamato" should be --Kanagawa-ken--.

Column 1, lines 30 and 35 respectively: "inforamtion" should be --information--.

Column 2, lines 22 and 25 respectively: "timing" should be --time--.

Column 3, line 15: "taht" should be --that--.

Signed and Sealed this

Twentieth Day of October 1981

[SEAL]

*Attest:*

*Attesting Officer*

GERALD J. MOSSINGHOFF

*Commissioner of Patents and Trademarks*